United States Patent
Vaziri (10) Patent No.: US 6,961,052 B1
(45) Date of Patent: Nov. 1, 2005

(54) METHODS AND APPARATUS FOR PROVIDING MULTI-DIRECTIONAL NAVIGATION CONTROL

(75) Inventor: Seyamak Vaziri, Milpitas, CA (US)

(73) Assignee: Cisco Technology, Inc., San Jose, CA (US)

(*) Notice: Subject to any disclaimer, the term of this patent is extended or adjusted under 35 U.S.C. 154(b) by 406 days.

(21) Appl. No.: 10/390,486

(22) Filed: Mar. 17, 2003

(51) Int. Cl.[7] .............................................. G09G 5/00
(52) U.S. Cl. ...................................... 345/184; 345/156
(58) Field of Search ................................ 345/156, 157, 345/161, 167, 184; 341/21, 22; 200/5.1, 200/566

(56) References Cited

U.S. PATENT DOCUMENTS

| | | | |
|---|---|---|---|
| 5,774,075 A * | 6/1998 | Palalau et al. ................. 341/35 |
| 5,936,613 A * | 8/1999 | Jaeger et al. ................. 345/172 |
| 6,331,850 B1 | 12/2001 | Olodort et al. ............. 345/168 |
| 6,411,275 B1 | 6/2002 | Hedberg ..................... 345/156 |
| 6,480,185 B1 | 11/2002 | Kiljander et al. ........... 345/167 |
| 6,563,434 B1 | 5/2003 | Olodort et al. ............... 341/22 |
| 6,577,928 B2 | 6/2003 | Obradovich ................... 701/1 |
| 6,636,197 B1 | 10/2003 | Goldenberg et al. ........ 345/156 |
| 6,650,314 B2 | 11/2003 | Philipson ..................... 345/157 |
| 6,681,111 B2 | 1/2004 | Ahn et al. ................... 455/420 |
| 6,686,911 B1 | 2/2004 | Levin et al. ................. 345/184 |
| 2002/0122031 A1 * | 9/2002 | Maglio et al. .............. 345/184 |
| 2002/0171627 A1 * | 11/2002 | Noguchi et al. ............ 345/156 |
| 2003/0095096 A1 * | 5/2003 | Robbin et al. .............. 345/156 |
| 2004/0257339 A1 * | 12/2004 | Takahashi ................... 345/156 |

* cited by examiner

*Primary Examiner*—Amare Mengistu
(74) *Attorney, Agent, or Firm*—David E. Huang, Esq.

(57) ABSTRACT

A navigation control apparatus, such as used to control a cursor on a display of an IP telephone, has a geometry that allows a user to produce a diagonal motion of the cursor displayed on the IP telephone. The navigation control apparatus has a support mount having navigation contact terminals and navigation actuators aligned with the navigation contact terminals, each navigation actuator configured to form an electrical contact with each of the contact terminals. Each navigation actuator and contact terminal defines a travel distance for each navigation actuator. The navigation control apparatus has a hemispherical navigation controller pivot coupled to the support mount. A navigation controller actuates the navigation actuators and defines rounded recess that engages and rotates about the navigation controller pivot during an actuation procedure. The rounded recess of the navigation controller and the hemispherical shape of the navigation controller pivot define a navigation controller travel distance that is approximately one-half the travel distance of each navigation actuator.

21 Claims, 7 Drawing Sheets

FIG. 7

METHODS AND APPARATUS FOR PROVIDING MULTI-DIRECTIONAL NAVIGATION CONTROL

BACKGROUND OF THE INVENTION

Navigation controls allow a user the ability to position an object, relative to a reference, through activation of an electromechanical switch. Conventional navigation controls, such as joystick controls, are used for electronic games (e.g., to position a computer-generated object on a display) and for steering control devices for self-propelled electric wheelchairs (e.g., to position the wheelchair in space). Computerized devices, such as cellular telephones, personal digital assistants (PDA's), and Internet Protocol (IP) telephones, typically utilize multiple position or multi-direction navigation controls for directing movement of a cursor on associated computer display.

Conventional joystick controls use a central actuating lever that pivots about a central point to close switch contacts located in proximity to the central point. During operation of a typical joystick, a user positions the joystick to close one of four switch contacts to move an object in space or an object appearing on a section. For example, the user closes the individual switch contacts to move the object along either a north-south (e.g., up and down) direction or an east-west (e.g., left and right) direction, within to a two-dimensional, Cartesian coordinate system, relative to the user. The user also closes combinations of adjacent switch contacts to move the object along a northeast, southwest, northwest, or southeast (e.g., diagonal) direction within the coordinate system relative to the user.

Conventional computerized devices (e.g., IP telephones, cellular telephones, PDA's) typically include a display for a user interactive menu associated with the device. The conventional computerized devices also have a navigation control that allows a user to navigate a cursor in either a north-south (e.g., up-down) direction or an east-west (e.g., right-left) direction relative to the display. Such navigation allows the user to select or activate particular device functions listed in the menu.

SUMMARY

Conventional navigation controls suffer from a variety of deficiencies. For example, as described above, conventional navigation controls, such as computer joystick controls allow user positioning of an object relative to a reference. For example, a user utilizes a joystick control to position a cursor or object on a display or to position a device, such as a wheelchair, in space. Conventional joystick controls typically produce a feedback to a user (e.g., either an audible "clicking" sound or the feeling of actuating a switch) when the user engages the joystick control in a north, south, east, or west position. Conventional joysticks do not provide feedback to a user when the user engages the joystick control in a northeast, northwest, southeast, or southwest (e.g., diagonal).

For example, in a conventional joystick control, a user simultaneously engages two adjacent switch controls to position an object along a diagonal direction. However, such a configuration does not provide a user with a physical sensory feedback indicating engagement of the switch contacts during diagonal motion of the joystick control. Without proper physical feedback, a user may be unaware as to an acceptable amount of force to apply to the joystick control during diagonal navigation. In one case, the user can "over actuate" the switch contacts during diagonal motion to create a relatively large force on the contacts, thereby potentially damaging or destroying the controls. In another case, the user can "under actuate" the switch contacts, thereby creating a relatively small force on the switch contacts resulting in non-motion of an object along a diagonal direction.

Certain electronic or computerized devices, such as conventional IP telephones, have navigation controls that allow a user to navigate a cursor through a menu shown on an associated display. However, typical navigation controls for IP telephones do not allow for diagonal navigation of a cursor on the associated display. Therefore, to navigate a cursor along a diagonal direction on the display, a user actuates the navigation controls in a series of steps (e.g., alternating east and north switch controls to move the cursor in a northeast diagonal direction). Such actuation is time consuming to the user.

During manufacture of computerized devices, such IP telephones having the described navigation controls, manufacturers typically attach the navigation control or multi-directional navigation switch as a separate module, to the computerized device. Use of a non-integral or separate navigation control with an IP phone, cellular phone, or PDA increases the cost of goods sold (COGS) with respect to manufacture of the device.

By contrast to the use of prior navigation controls, embodiments of the present invention significantly overcome such deficiencies and provides a navigation control apparatus having a geometry that allows a user to produce a diagonal motion of an object relative to a reference, such as a cursor displayed on the display of an IP telephone, via engagement of two adjacent navigational switches. The present navigation control is integrally formed as part of a computerized device, such as an IP telephone, thereby decreasing the COGS associated with the computerized device. The present navigation control, furthermore, provides a tactile feedback to the user during actuation of the navigation control along a diagonal direction. The tactile feedback limits the user from either "over actuating" or "under actuating" the switch contacts of the navigation control, thereby minimizing damage to the navigation control and maximizing the user's ability to produce an output signal during diagonal actuation of the navigation control.

In one arrangement, a navigation control assembly has a housing, a support mount in communication with the housing, the support mount having a plurality of navigation contact terminals, and a plurality of navigation actuators aligned with the plurality of navigation contact terminals. Each of the plurality of navigation actuators is configured to engage the plurality of navigation contact terminals to form an electrical contact with each of the plurality of contact terminals. Each navigation actuator and each contact terminal defines a travel distance for each navigation actuator. The navigation control assembly also has a navigation controller pivot coupled to the support mount, the navigation controller pivot defining a substantially hemispherical shape and a navigation controller in communication with the housing, the navigation controller configured to actuate the plurality of navigation actuators, the navigation controller defining a substantially rounded recess configured to engage and rotate about the navigation controller pivot during an actuation procedure, the substantially rounded recess of the navigation controller and the substantially hemispherical shape of the navigation controller pivot defining a navigation controller travel distance, the navigation controller travel distance being approximately one-half the travel distance of each navigation actuator. The geometry of the travel distance of the navigation controller and the travel distance of the navigation actuator allows a user to engage two adjacent navigation actuators during an actuation procedure. Such actuation allows for diagonal motion of a cursor of an associated display, such as on an IP telephone, for example.

In one arrangement, the housing is configured to compress the navigation actuators such that the navigation actuators bias the navigation controller against the housing. Such configuration secures the navigation controller within the navigation control assembly without limiting motion between the navigation controller pivot and the navigation controller.

In one arrangement, the housing has a lip portion in communication with the navigation controller. The lip portion limits rotation of the navigation controller about the navigation controller pivot during an actuation procedure. Such limitation of over-rotation minimizes potential damage to the navigation actuators caused by over-actuation of the navigation controller.

In one arrangement, each of the plurality of navigation actuators is formed of an elastomeric material. Use of such a material provides resiliency of the navigation actuators. The elastomeric material also allows a user to apply a relatively large number of actuation cycles to the navigation actuators prior to failure, as compared to the relatively smaller number of actuation cycles applied to conventional electromechanical actuators prior to failure.

In one arrangement, the navigation controller pivot is formed of an elastomeric material. By forming the navigation controller pivot from the same elastomeric material as the navigation actuators, a manufacturer forms the navigation controller pivot on the support mount during the same procedure as formation of the navigation actuators. Such formation reduces the cost of manufacture (e.g., or COGS) of the navigation control assembly. Furthermore, such an arrangement minimizes the necessity for use or attachment of a separate navigation control module, thereby lowering manufacturing costs associated with a device (e.g., IP telephone) utilizing the navigation control assembly.

In one arrangement, the navigation control assembly has tactile actuators in communication with the support mount, at least one tactile actuator interposed between two adjacent navigation actuators, the at least one tactile actuator configured to produce tactile feedback during an actuation procedure actuating the two adjacent navigation actuators. The tactile feedback produced by tactile actuators indicates, to a user, activation of two adjacent navigation actuators. Such tactile feedback limits over-activation or under-activation of adjacent navigation actuators during an actuation procedure, thereby minimizing damage to the associated switch controls and maximizing the user's ability to produce an output signal during diagonal actuation of the navigation control.

In one arrangement, each tactile actuator and the support mount define a travel distance for each tactile actuator, the navigation controller travel distance being approximately one-half of the travel distance of each tactile actuator. The geometry of the travel distance of the navigation controller and the travel distance of the tactile actuator allows a user to engage not more than three adjacent actuators (e.g., engagement of two navigation actuators and one tactile actuator or engagement of one navigation actuator and two tactile actuators). Such actuation allows for diagonal motion of a cursor on an associated display, such as on an IP telephone, for example.

In one arrangement, the navigational control assembly has two or more tactile actuators and a diagonal navigation actuator interposed between two adjacent, substantially orthogonally positioned navigation actuators, the two or more tactile actuators and the diagonal navigation actuator coupled to the support mount. Such an arrangement provides relatively finer degrees of diagonal actuation during actuation of the navigation control, as provided by the diagonal navigation actuator, and provides tactile feedback to a user during such actuation.

In one arrangement, the tactile actuators are formed from an elastomeric material. By forming tactile actuators from the same elastomeric material as the navigation actuators, a manufacturer forms the tactile actuators on the support mount during the same procedure as formation of the navigation actuators. Such formation reduces the cost of manufacture of the navigation control assembly.

In another arrangement, the present invention relates to a method for constructing a navigation control. A manufacturer produces a support mount having a plurality of navigation contact terminals and aligns a plurality of navigation actuators with the plurality of navigation contact terminals, each of the plurality of navigation actuators configured to engage the plurality of navigation contact terminals to form an electrical contact with each of the plurality of contact terminals, each navigation actuator and each contact terminal defining a travel distance for each navigation actuator. The manufacturer couples a navigation controller pivot to the support mount where the navigation controller pivot defines a substantially hemispherical shape. The manufacturer aligns a navigation controller with the navigation controller pivot, the navigation controller configured to actuate the plurality of navigation actuators, the navigation controller defining a substantially rounded recess configured to engage and rotate about the navigation controller pivot during an actuation procedure, the substantially rounded recess of the navigation controller and the substantially hemispherical shape of the navigation controller pivot defining a navigation controller travel distance, the navigation controller travel distance being approximately one-half the travel distance of each navigation actuator. The manufacturer then places a housing in communication with the support mount and in communication with the navigation controller.

The features of the invention, as described above, may be employed in electronic equipment and methods such as those of Cisco Systems of San Jose, Calif.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

The present invention relates to a navigation control apparatus and method for constructing a navigation control. The geometry of the present navigation control allows a user to produce a diagonal motion of an object relative to a reference, such as a cursor displayed on the display of an IP telephone. The present navigation control is integrally formed as part of a computerized device, such as an IP telephone, thereby decreasing the COGS associated with the computerized device. The present navigation control, furthermore, provides a tactile feedback to the user during actuation of the navigation control along a diagonal direction. The tactile feedback limits the user from either "over actuating" or "under actuating" the switch contacts of the navigation control, thereby minimizing damage to the navigation control and maximizing the user's ability to produce an output signal during diagonal actuation of the navigation control.

Figure 1:
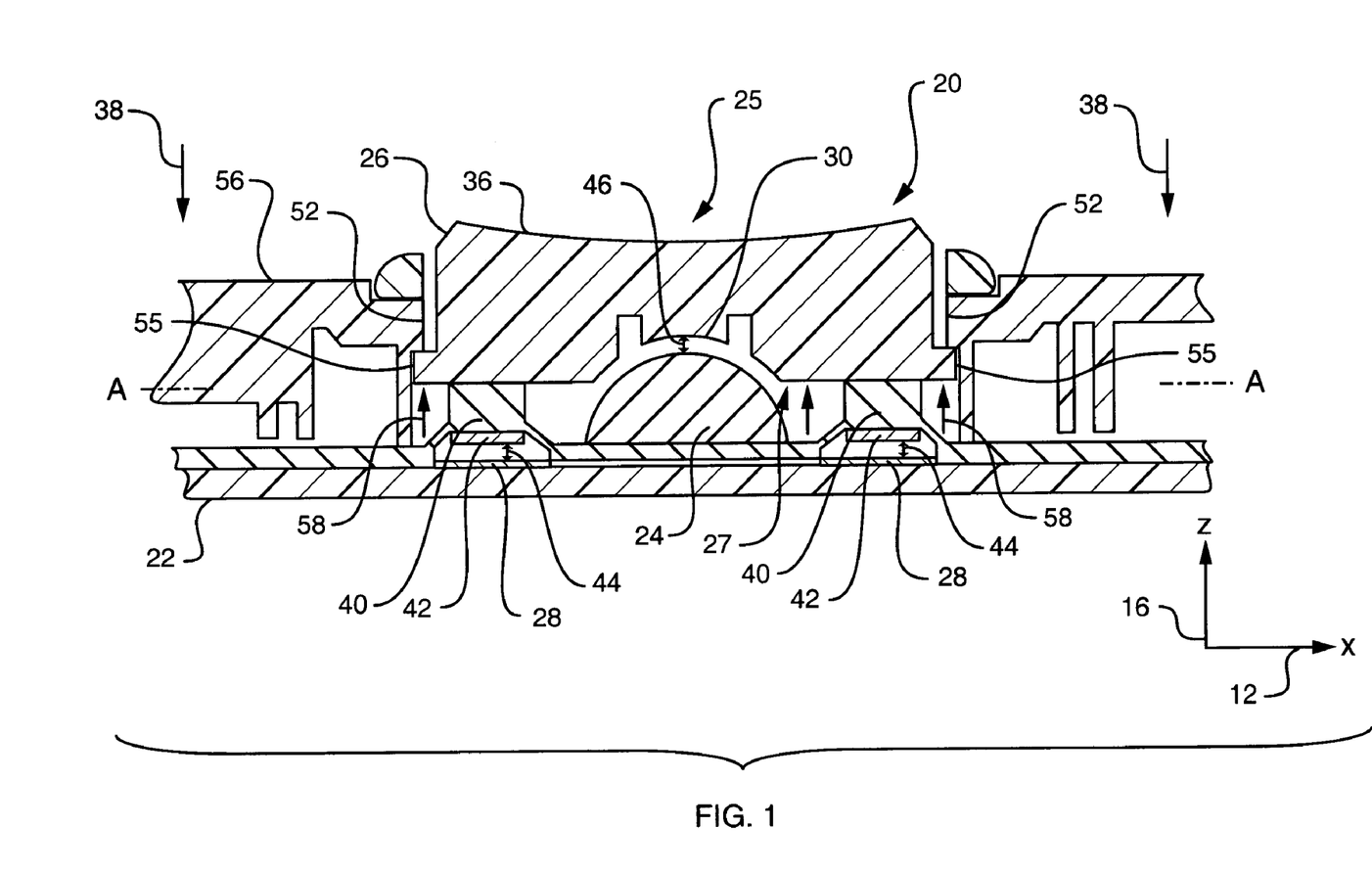
FIG. 1 illustrates a sectional view of a navigational control assembly along an A—A axis, according to one embodiment.

FIG. 1 illustrates a sectional view of a navigation control assembly 20 along an A—A axis. In one arrangement, the navigation control assembly 20 is integrally formed as part of a computerized device, such as an IP telephone, cellular phone, or PDA. As shown, the navigation control assembly 20 has a housing 56, a support mount 22, navigation actuators 40, a navigation controller pivot 24, and a navigation controller 26.

The support mount 22, in one arrangement, is a circuit board of a computerized device and includes navigation contact terminals 28. The navigation contact terminals 28 are formed of an electrically conductive material, such as a metallic material for example. The navigation contact terminals 28 are configured to create an electric signal (e.g., voltage) to direct or navigate an object, such as a cursor displayed on an associated display (e.g., computer display, IP telephone display, cellular phone display, etc.) to any position within a two-dimensional or Cartesian space. The support mount 22 has four navigation contact terminals 28. In one arrangement, each navigation contact terminal 28 is positioned substantially orthogonally relative to each adjacent navigation contact terminal 28. Engagement of individual contact terminals 28 by a corresponding electrically conductive material 42 (e.g., each contact terminal 28 and each corresponding electrically conductive material form a switch), closes an electrical circuit and creates the signal or voltage.

In a computerized device or system, such as an IP telephone, for example, engagement of individual contact terminal 28 allows a user to navigate a cursor in a north, south, east, or west direction (e.g., up-down or side-to-side direction) relative to a two-dimensional coordinate system of the display associated with the IP telephone. Engagement of two adjacent contact terminals 28 with the electrically conductive material 42 allows a user to navigate the cursor in a northeast, southeast, southwest, or northwest direction (e.g., diagonal direction) relative to the coordinate system of the display.

Figure 2:
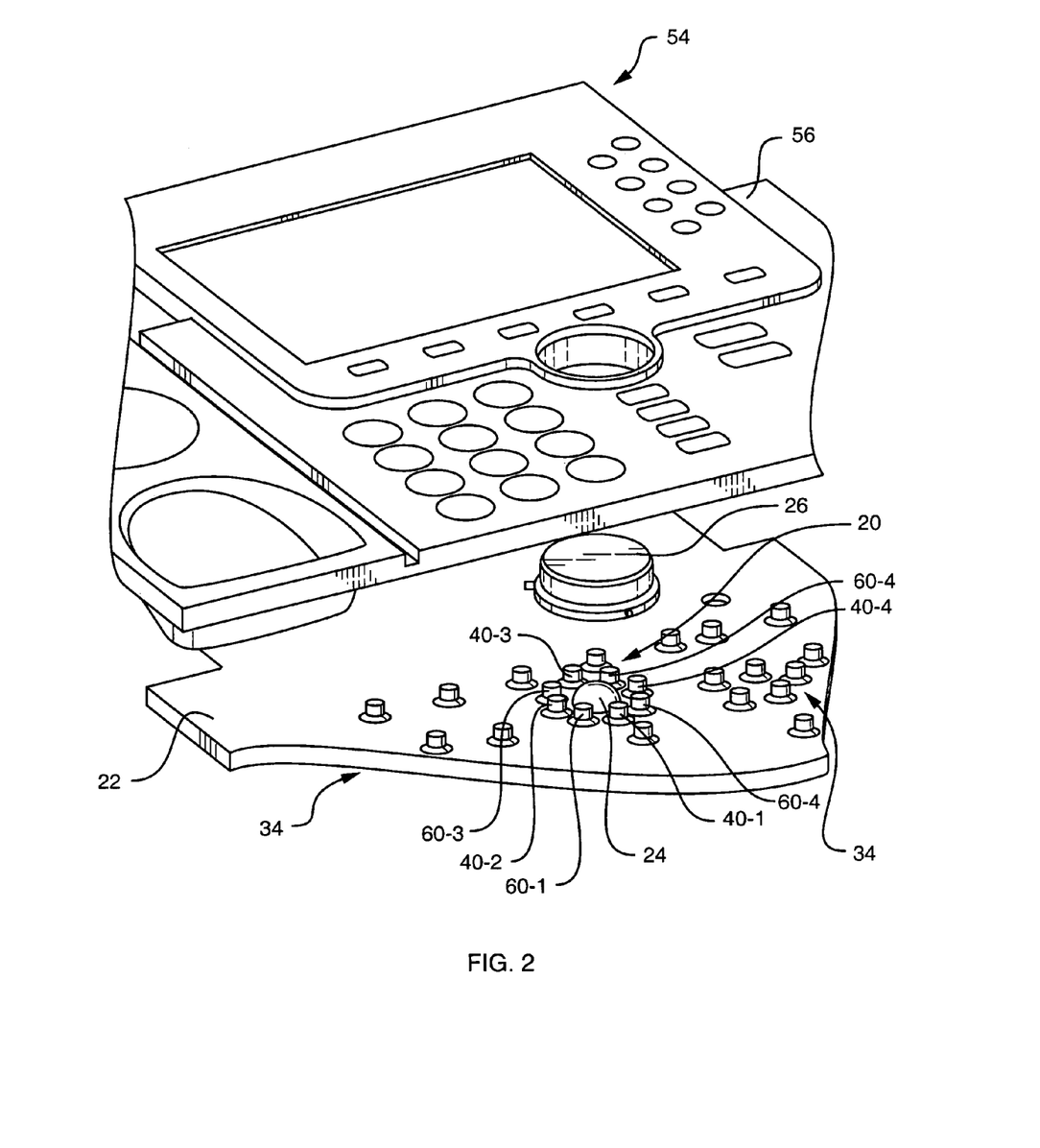
FIG. 2 illustrates an exploded view of a navigational control assembly and housing, according to one embodiment.

The navigation actuators 40 align with the navigation contact terminals 28 and are configured to engage the plurality of navigation contact terminals 28 to form an electrical contact with each of the contact terminals 28. For example, in the case where the support mount 22 is configured with four navigation contact terminals 28, the navigation control assembly 20 is configured with four respective navigation actuators 40-1, 40-2, 40-3, and 40-4, such as illustrated in FIG. 2. Returning to FIG. 1, in one arrangement, the navigation actuators 40 have associated conductive elements or conductive materials 42 mounted to the navigation connector 40, indirectly opposing the navigation contact terminals 28. For example, in one arrangement each electrically conductive element 42 is formed of a carbon material. During an actuation procedure, a user depresses a navigation actuator 40 such that the conductive element 42 contacts the corresponding navigation contact terminal 28, thereby closing a circuit and creating a signal that directs an object (e.g., cursor) to move in a direction corresponding to the signal.

The navigation actuators 40 and the contact terminals 28 further define a travel distance 44 for the navigation actuators. For example, in one arrangement, the travel distance 44 for the navigation actuators 40 is 1.4 mm. The travel distance 44 separates the conductive element 42 of each navigation actuator 40 from the navigation contact terminal 28 of the support mount 22. Such separation limits unwanted or inadvertent contact between the contact terminals 28 and the conductive element 42 in response to a motion (e.g., vibrational motion) applied to the navigation control assembly 20. Furthermore, as described below, the travel distance 44 of the navigation actuators 40 in conjunction with a travel distance 46 between the navigation controller 26 and the navigation controller pivot 24, allows a user to engage two adjacent navigation actuators 40 in a substantially simultaneous manner, thereby allowing diagonal positioning or motion of an object (e.g., a cursor) associated with the navigation control assembly 20.

In one arrangement, navigation actuators 40 are formed of an elastomeric material, such as a silicone material. The elastomeric material provides resilience to the navigation actuators 40 during actuation procedure. For example, as a user depresses or actuates the navigation actuators 40, the navigation actuators 40 displace toward the corresponding navigation contact terminals 28 (e.g., along z-axis 16) of the support mount 22. Because of the resiliency of the elastomeric material of the navigation actuators, upon release of the navigation controller 26, the navigation actuators 40 displace along a direction opposing support mount 22 and return to a non-actuated or "at rest" position. Such resiliency of the navigation actuators 40 allows a user to expose the navigation actuators 40 to relatively large number of actuation cycles prior to failure of the navigation actuators 40, compared to conventional electromechanical actuators.

By forming the navigation actuators 40 from an elastomeric material, manufacturers, in certain cases, can integrate the navigations control assembly 20 into existing computerized devices (e.g., IP telephones) economically and without the addition of a separate navigation control module.

FIG. 2 illustrates an exploded view of an IP telephone 54 having a navigation control assembly 20 integrally formed as part of the IP telephone 54. Conventional IP telephones 54 have multiple functions actuators 34 that control or allow user access to various functions associated with the IP telephones. The function actuators 34 are conventionally formed from an elastomeric material and are configured to engage associated contact terminals. By forming the navigation actuators 40 from the same material as the conventional function actuators 34, manufacturers can form the navigation actuators 40 during the same process used to form the function actuators 34, thereby minimizing manufacturing costs for the IP telephone 54. Furthermore, by integrally forming the navigation actuators 40 (and the navigation control assembly 20) as part of the IP telephone, a manufacturer reduces the need to purchase and install a separate multi-position navigation control module into the IP telephone 54, thereby reducing manufacturing cost (e.g., COGS) associated with manufacture of the IP telephone 54.

Returning to FIG. 1, the navigation controller pivot 24 couples to the support mount 22 and has a substantially hemispherical shape. In one arrangement, the navigation controller pivot 24 is formed of an elastomeric material, such as a silicone material. As describe with respect to FIG. 2, conventional IP telephones 54 uses multiple functional actuators formed of elastomeric material. By forming the navigation controller pivot from the same material used to form the function actuators 34 (e.g., or the navigation actuators 40), a manufacturer forms the navigation controller pivot 24 during the same process used to form the function actuators 34, thereby minimizing the manufacturing costs for the IP telephone 54.

The navigation controller 26 controls actuation of the navigation actuators 40 during an actuation procedure. The navigation controller 26 is configured with a concave depression 36 along a first surface 25 to provide an interface with a user and allow user engagement of the navigation controller 26. The navigation controller 26 also defines a substantially rounded recess 30 along a second surface 27 opposing the first surface 25. The recess 30 is configured to engage and rotate about the navigation controller pivot 24 during an actuation procedure. The relative (e.g., ball and socket) geometry between the rounded recess 30 of the navigation controller 26 and substantially hemispherical shape of the navigation controller pivot 24 provides a user with uniform motion of the navigation controller 26 regardless of the direction of actuation of the navigation controller 26. For example, the rounded recess 30 geometry of the navigation controller 26 and hemispherical shape of the navigation controller pivot 24 provides the user with a uniform motion (e.g., uniform "feel") when the user actuates the navigation controller 26 along a north, south, east west, or diagonal direction.

The substantially rounded recess 30 of the navigation controller 26 and the substantially hemispherical shape of the navigation controller pivot 24 define a navigation controller travel distance 46. The navigation controller travel distance 46 is approximately one-half the travel distance 44 of each navigation actuator 40. For example, as described above, the travel distance 44 of the navigation actuators 40 is approximately 1.4 mm. In such a case, the corresponding travel distance 46 of the navigation controller 26 is approximately 0.7 mm. The relative geometry of the travel distances 44 of the navigation actuators 40 and the travel distance 46 of the navigation controller 26 allows the navigation controller 26 to engage two adjacent navigation actuators 40 during a single actuation procedure, thereby allowing for diagonal navigation of an object. For example, based upon the described geometry, a user engages both a first navigation actuators 40-1 and a second navigation actuator 40-2, such as shown in FIG. 2, to position an object or move a cursor on a display along a diagonal direction.

The housing 56 of the navigation control assembly 20 is in communication with the support mount 22 and engages the navigation controller 26. Such placement maintains an alignment or orientation of the navigation controller 26 relative to the navigation actuators 40, the navigation control pivot 24, and the support mount 22 in a when the navigation controller 26 is in a non-actuated or "at-rest" position.

In one arrangement, the housing 56 has a lip portion 50 configured to engage a corresponding lip portion 55 of the navigation controller 26. During assembly, a manufacturer places the navigation controller 26 in communication with the navigation actuators 40. The manufacturer then places the lip portion 52 of the housing 56 in communication with (e.g., against) the lip portion 55 of the navigation control 26. The manufacturer then attaches the housing 56 to the support mount 22. As shown in FIG. 1, in one arrangement, the lip portion 52 of the housing 56 maintains the navigation controller 26 within the navigation control assembly 20.

In one arrangement, the housing 56, compresses the navigation actuators 40 such that the navigation actuators 40 bias navigation controller 26 against the housing 56. For example, as described above, during manufacture of the navigation control assembly 20, the manufacturer engages the housing 56 against the navigation controller 26 and secures couples the housing 56 to do the support mount 22. Such in coupling causes the navigation controller 26 to compress the navigation actuators 40. Also as described above, the navigation actuators 40 are formed from a resilient material, such as an elastomeric material. Application of a compressive axial force 38 by the housing 56 on the navigation controller 26 causes the navigation controller 26 to compress the navigation actuators 40. In turn, the navigation actuators 40 create an equal and opposite force 58 on the navigation controller 26. Such force 58 acts to bias the navigation controller 26 against the housing 56 of the navigation control assembly 20. The biasing 58 secures the navigation controller 26 within navigation control assembly 20 without limiting motion between the navigation controller 24 and the navigation controller 26. Such biasing also allows the navigation controller 26 to return to an "at rest" or steady-state position (e.g., the navigation controller 26 loaded against the housing), as shown in FIG. 1, after application and a removal of actuating force to the navigation controller 26.

While the housing 56 maintains the navigation controller 26 within the navigation control assembly 20, the housing 56 also acts to maintain geometric positioning among the navigation controller 26, the navigation controller pivot 24, the navigation actuators 40, and the support mount 26 during an actuation procedure.

Figure 3:
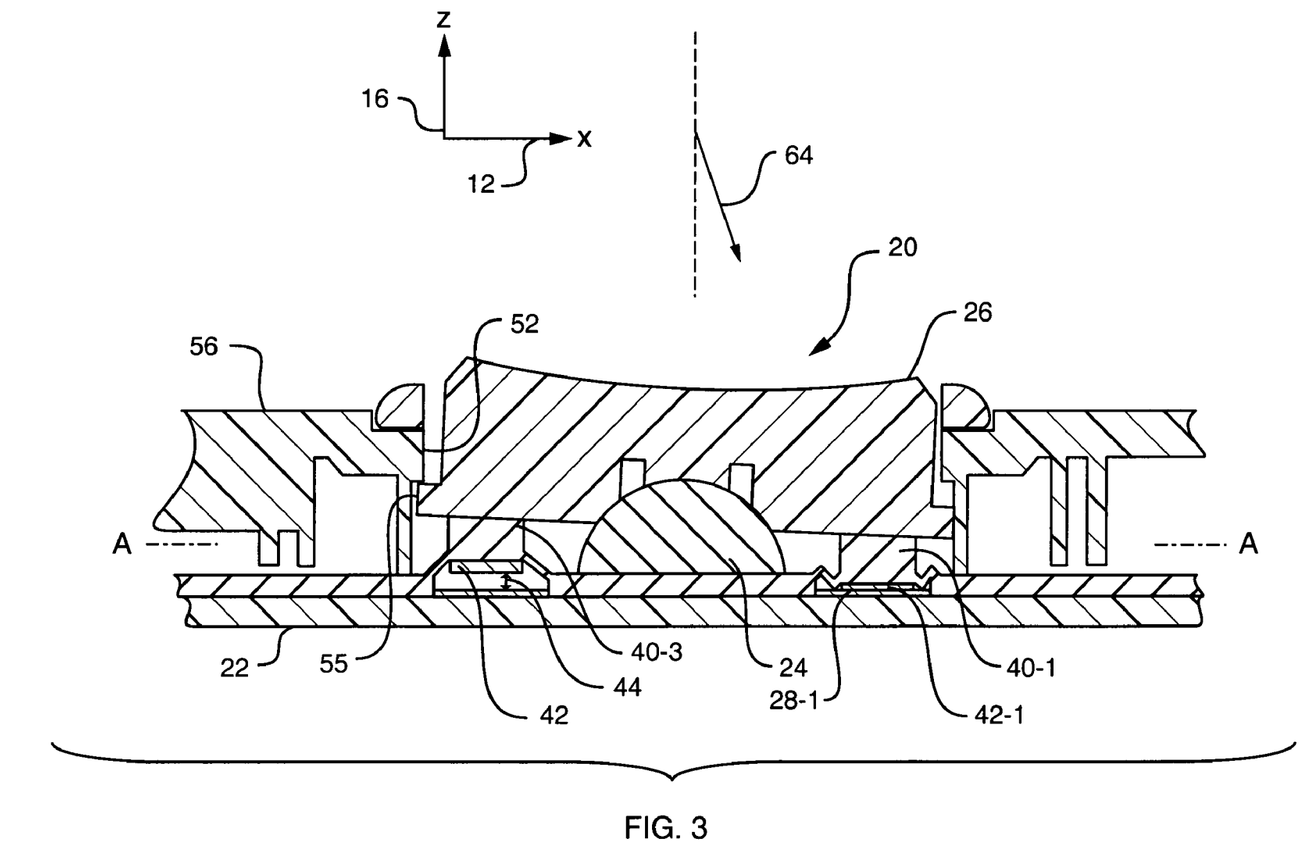
FIG. 3 illustrates actuation of the navigation control assembly of FIG. 1, according to one embodiment.

FIG. 3 illustrates the navigation control assembly 20 when the navigation controller 26 undergoes an actuation procedure. In one arrangement, the lip portion of 52 of the housing 56 limits the rotation of the navigation controller 26 about the navigation controller pivot 24 during the actuation procedure.

For example, assume that during actuation, a user places a load or force 64 on the navigation controller 26 where the force is non-parallel to a reference axis or z-axis 16 (e.g., the z-axis 16 perpendicular to a normal or x-axis 12 of the assembly 20). Such a force 64 decreases the travel distance 46 for the navigation controller 26 until the navigation controller 26 engages navigation controller pivot 24. After such engagement, the force 64 causes the navigation controller 26 to rotate about navigation controller pivot 24. As the navigation controller 26 rotates about the pivot 24, the rotation reduces the travel distance 44 of the navigation actuator 40-1 (e.g., a navigation actuator 40 towards which the force 64 is directed) by compressing the navigation actuator 40-1. Such compression creates an electrical contact between the electrically conductive element 42 of the navigation actuator 40-1 and the corresponding navigation contact terminal 28-1.

Also during the rotation of the navigation controller 26 about navigation controller pivot 24, the lip portion 55 of the navigation controller 26 engages the lip portion 52 of the housing 56. The housing 56, therefore, maintains geometric positioning among the navigation controller 26, the navigation controller pivot 24, the navigation actuators 40 by limiting over rotation of the navigation controller 26 relative to the navigation controller pivot 24 to minimize or prevent damage to either the conductive element 42-1 associated with the navigation actuators 40 or to the navigation contact terminal 28.

Figure 4:
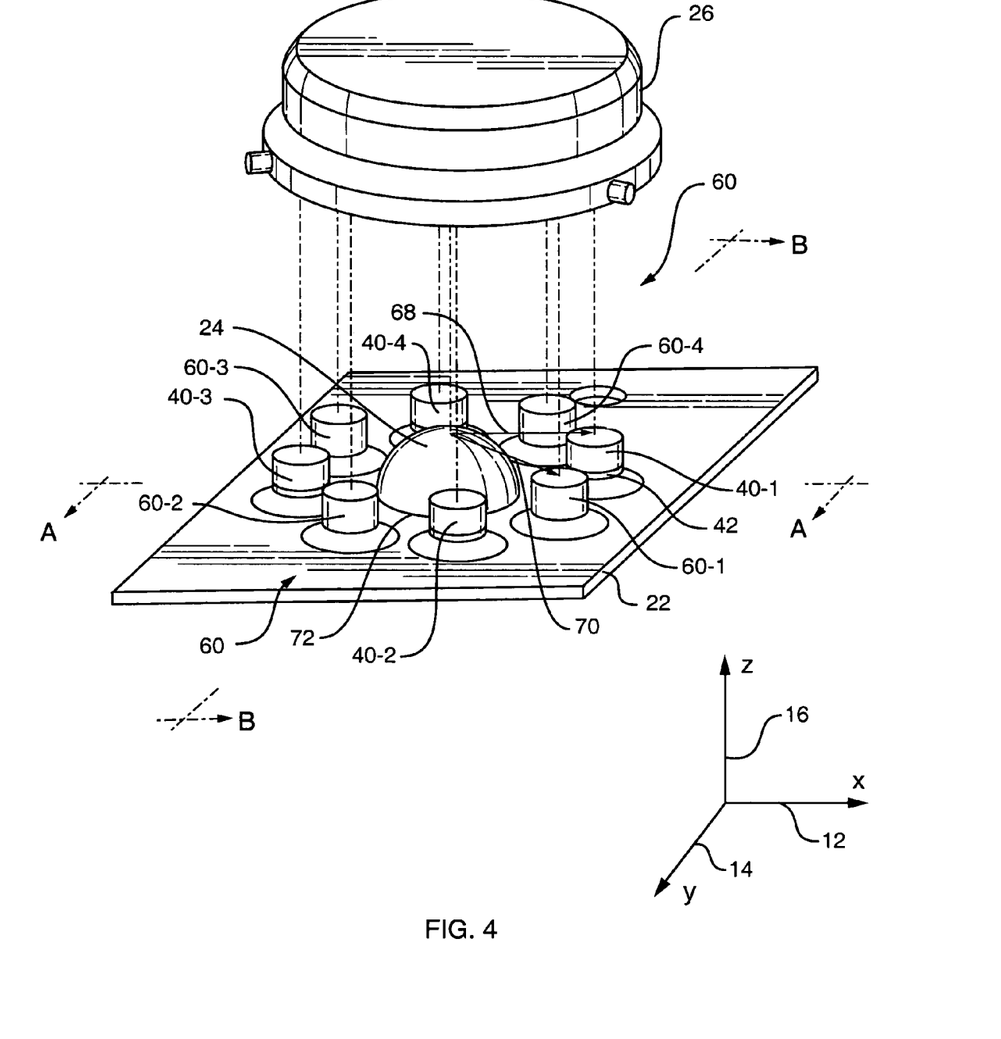
FIG. 4 illustrates an exploded view of a navigational control assembly, according to one embodiment.

FIG. 4 illustrates an exploded view of a navigational control assembly of the navigation control assembly 20. In such an arrangement, the navigation control assembly 20 has tactile actuators 60 in communication with the support 22. In such an arrangement, the tactile actuators are configured such that at least one tactile actuator 60-1 is interposed between two adjacent navigation actuators 40-1 and 40-2. The tactile actuators 60 provide a user with tactile feedback (e.g., the feeling of activating an actuator) during an actuation procedure along a diagonal line (e.g., northeast, northwest, southeast, and southwest direction) relative to the navigation actuators 40. Positioning of a tactile actuator 60 between each navigation actuator 40 provides the navigation control assembly 20 with a uniform feel such that a user detects compression of an actuator (e.g., either a navigation actuator 40 or a tactile actuator 60) during both non-diagonal and diagonal actuation procedures.

For example, for an IP telephone 54, assume a user wants to move a cursor on an IP telephone display along a diagonal direction (e.g., at a 45 degree angle relative to a boundary of the display, for example). By depressing the navigation controller 26 to engage two adjacent navigation controllers 40-1, 40-2 (e.g., creating two respective signals averaged by a computerized device and causing the cursor to move in a diagonal direction), the user engages and depresses the tactile actuator 60-1. The tactile actuator 60-1 provides a resistance to the depression (e.g. compression force) and provides the user with a physical sensation (e.g., feeling) as a feedback to allow the user to adjust the amount of force provided. Such feedback limits either over-actuation of the navigation controller 26 (e.g., potentially damaging the navigation contact terminals 28) or under-actuation of the navigation controller (e.g., producing no output from the navigation control assembly 20).

Figure 5:
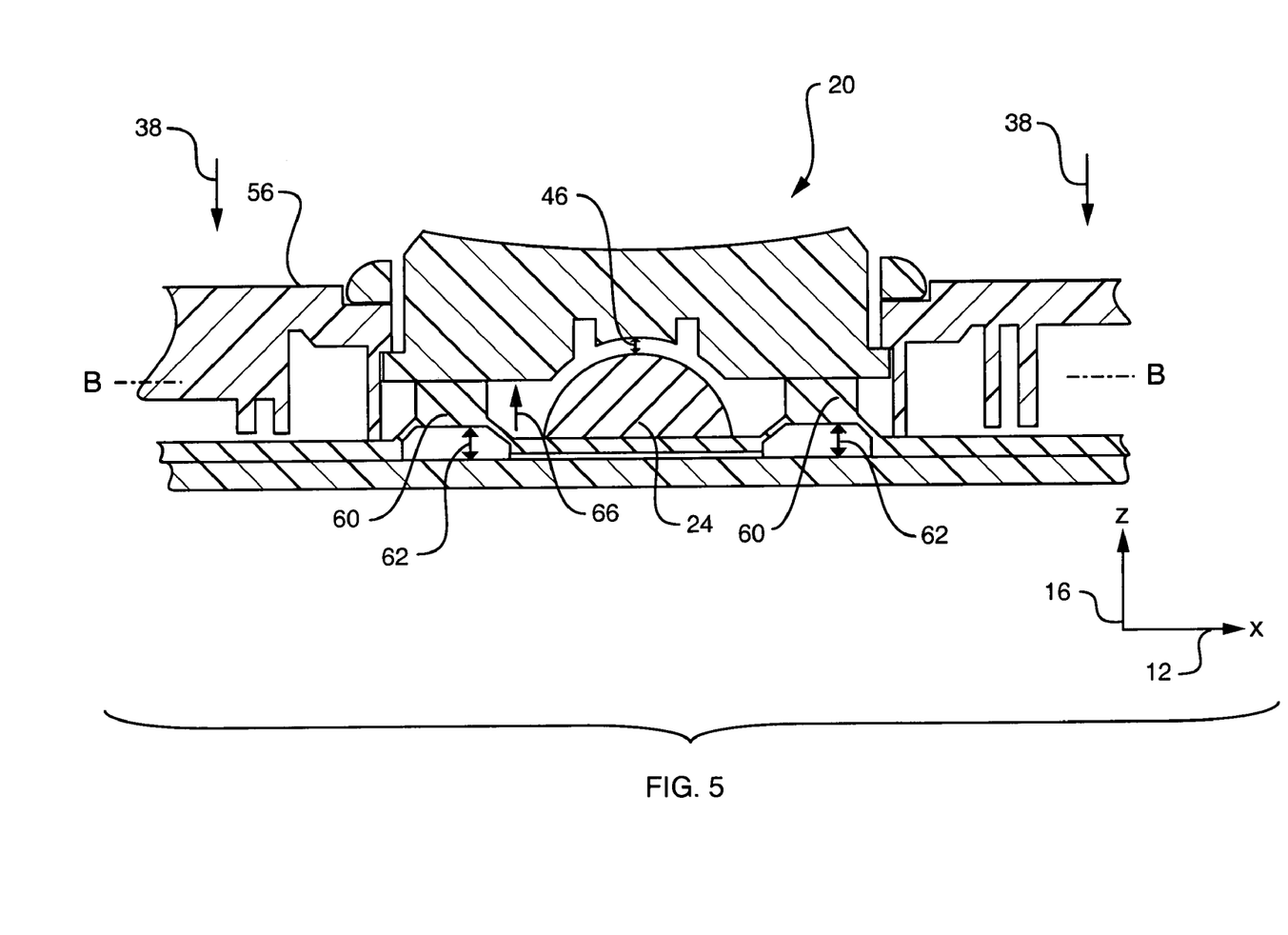
FIG. 5 illustrates a sectional view of a navigational control assembly along a B—B axis, according to one embodiment.

FIG. 5 illustrates a cross-sectional view of the navigation control assembly 20 along a B—B axis. Each tactile actuator 60 and the support mount 22 define a travel distance 62 for each tactile actuator 60. For example, in one arrangement, the travel distance 46 for the navigation controller 26 is approximately one-half of the travel distance 62 of each tactile actuator 60. For example, in the case where the travel distance 46 of the navigation controller is 0.7 mm, the travel distance 62 of the tactile actuator 60 is 1.4 mm. The relative geometry between the travel distance 46 of the navigation controller 26 and the travel distance 62 of the tactile actuator 60 allows a user to engage not more than three adjacent actuators (e.g., a combination of two adjacent navigation actuators 40-1, 40-2 and one tactile actuator 60-1 or one navigation actuator 40-1 and two tactile actuators 60-1, 60-4) during an actuation procedure. Such a configuration allows a user to engage two adjacent navigation actuators 40-1, 40-2 to produce a diagonal positioning of an object, relative to a reference, and to engage a single navigation actuator 40 during a north, south, east, or west positioning, relative to the reference.

In one arrangement, the housing 54 is configured to compress the tactile actuators 60 such that the tactile actuators 60 bias (e.g., produce a force 66 opposite to the compression force 38 created by the housing 56) the navigation controller 26 against the housing 56. As described above, with respect to the navigation actuators 40, such a force 66 maintains the navigation controller 26 within the navigation control assembly 20 and returns the navigation controller 26 to an "at rest" position (e.g., forced against the lip 52 of the housing 56) after removal of an actuation force.

In one arrangement, the tactile actuators 60 are formed of an elastomeric material. As described above, with respect to the navigation actuators 40, by forming the tactile actuators 60 from an elastomeric material in particular devices, such as IP telephones utilizing elastomeric actuators for existing device functions, a manufacturer forms the tactile actuators 60 during the same process used to form the existing device actuators, thereby minimizing manufacturing costs.

As indicated by FIG. 4, the tactile actuators 60 provide a user with tactile feedback during diagonal actuation of the navigation controller 26 along an approximate 45 degree angle relative to the orthogonal positioning of the navigation actuators 40. In one arrangement, the navigation control assembly 20 is configured to provide diagonal navigation and tactile feedback for diagonal actuation along multiple angles relative to the navigation control assembly 20.

Figure 6:
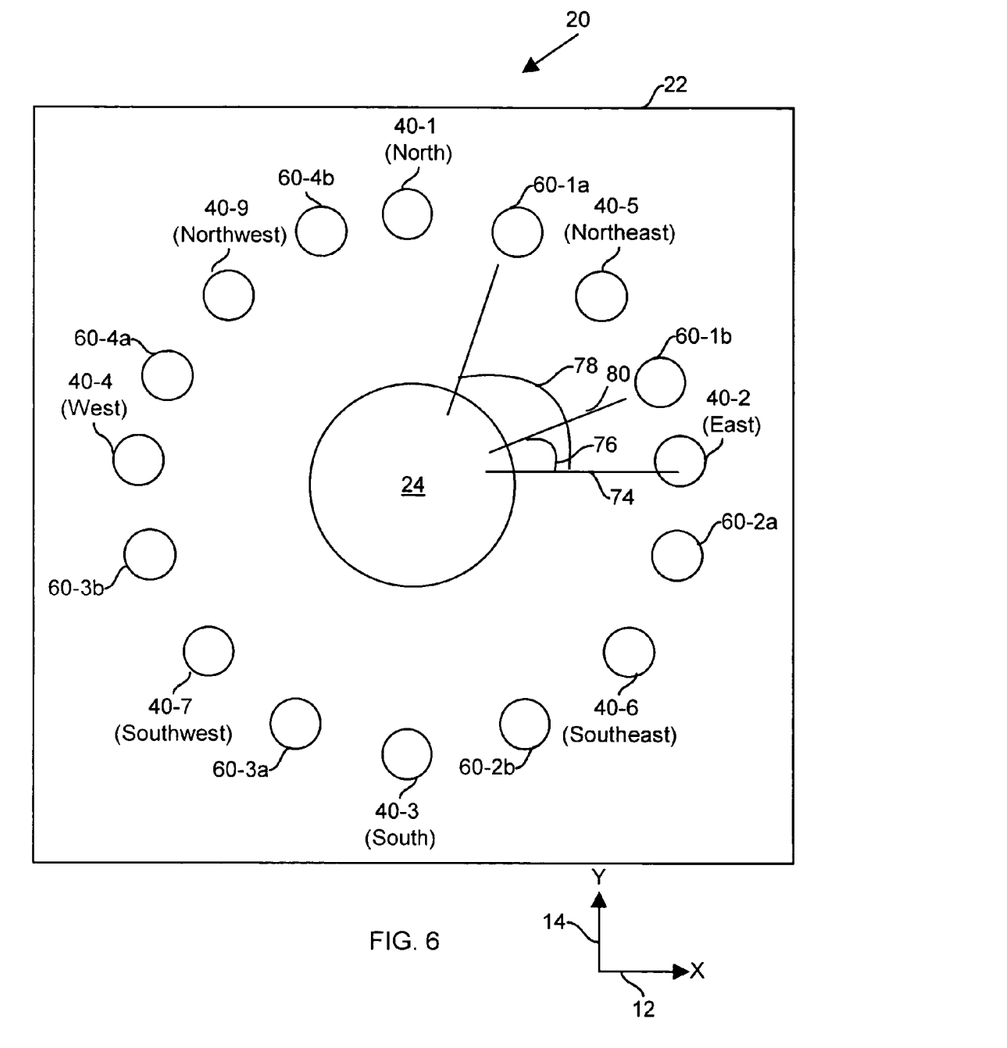
FIG. 6 illustrates a top view of the navigation control assembly of FIG. 5, according to another embodiment.

FIG. 6 illustrates a top view of the navigation control assembly 20, in one arrangement. The navigational control assembly 20 has, coupled to the support mount 22, orthogonally positioned navigation actuators 40-1 (north), 40-2 (east), 40-3 (south), and 40-4 (west) and additional diagonal navigation actuators 40-5 (northeast), 40-6 (southeast), 40-7 (southwest), and 40-8 (northwest) having electrically conductive elements 42. Interposed between any two adjacent navigation actuators 40, the navigation control assembly 20 has a tactile actuators 60 coupled to the support mount 22. The use of diagonal navigation actuators 40-5 through 40-8 along with the tactile actuators 60 provide diagonal navigation and tactile feedback for diagonal actuation along multiple angles relative to the navigation control assembly 20.

For example, as illustrated, the navigation control assembly 20 has tactile actuator 60-1a, diagonal navigation actuator 40-5, and tactile actuator 60-1b mounted to the support mount 22 and located between a first navigation actuator 40-1 and a second navigation actuator 40-2. The tactile actuators 60-2a, 60-1b, and the diagonal navigation actuator 40-5, as shown, divide the angular distance between the first navigation actuator 40-1 and the second navigation actuator 40-2 (e.g., angular distance of 90 degrees) into increments of 22.5 degrees. For example, tactile actuator 60-1b forms a first angle 76 of 22.5 degrees relative to a reference 74 and tactile actuator 60-1a forms a second angle 78 of 67.5 degrees relative to the reference 74. During actuation of the navigation controller 26 along a diagonal direction 80, the navigation controller engages the navigation actuator 40-2 and the diagonal navigation actuator 40-5 to create two respective navigation signals. The computerized device (e.g., IP telephone) associated with the navigation assembly 20, in one arrangement, averages the two navigation signals, created by actuation of the navigation actuator 40-2 and the diagonal navigation actuator 40-5, to position an object or cursor along an angle 76 of 22.5 degrees relative to a reference in space or a reference on a display, respectively. Also during actuation of the navigation controller 26 in such a case, the navigation controller 26 engages the tactile actuator 60-1b. The tactile actuator 60-1b provides tactile feedback to a user while engaging navigation actuators 40-2 and 40-5.

Figure 7:
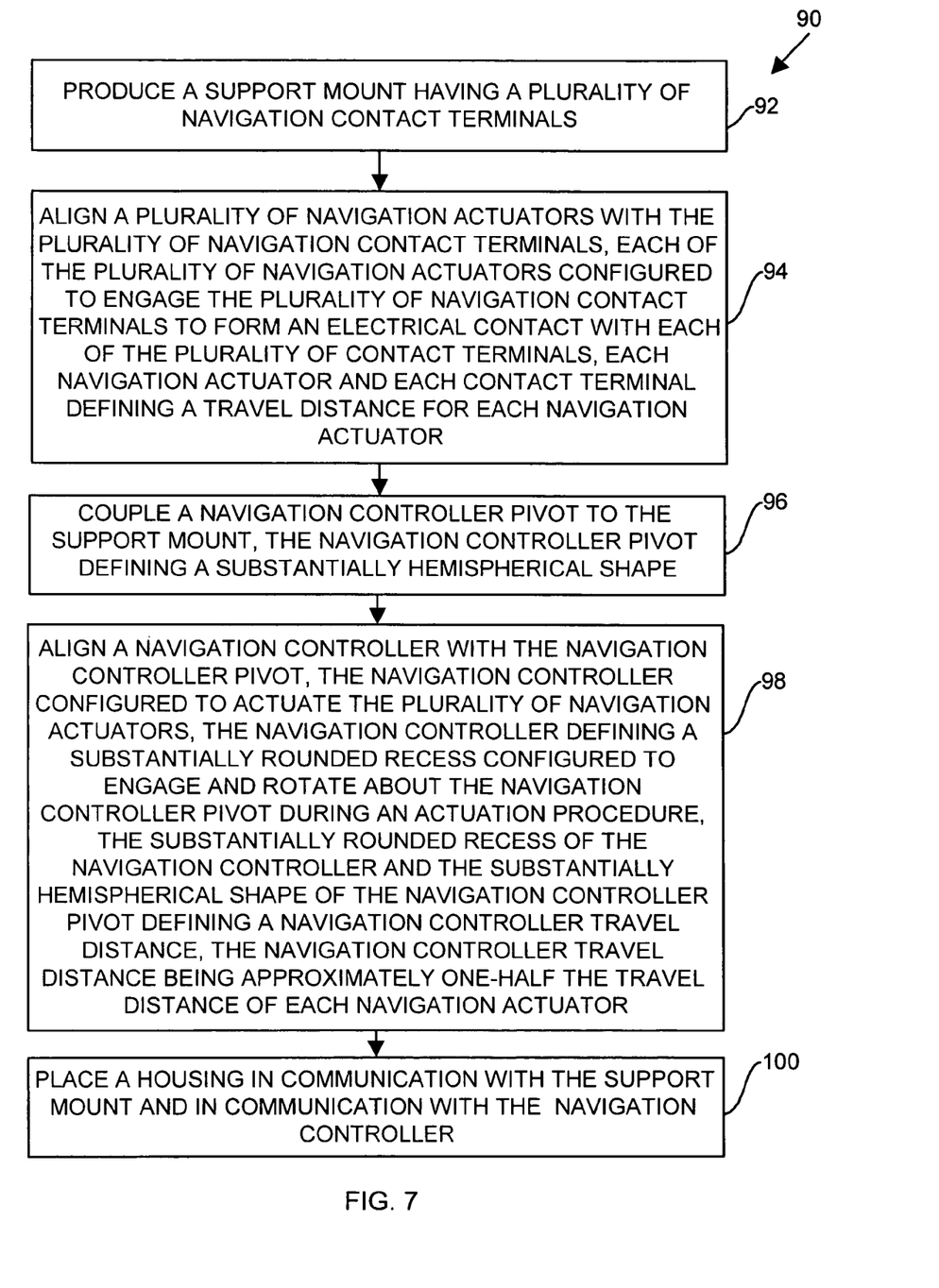
FIG. 7 is a flow chart showing a method for assembling a navigation control assembly, according to one embodiment.

FIG. 7 is a flow chart showing a method 90 for assembling a navigation control assembly, in one arrangement. A manufacturer performs such a method manually (e.g., using an operator or assembler) or automatically (e.g., using computer controlled machinery).

In step 92, a manufacturer produces a support mount 22 having navigation contact terminals 28. The navigation terminals 28 allow a user to navigate an object within a defined space, such as a cursor on a display.

In step 94, the manufacturer aligns navigation actuators 40 with the navigation contact terminals 28. Each of the navigation actuators 40 is configured to engage the navigation contact terminals 28 to form an electrical contact with each of the contact terminals 28. Each navigation actuator and each contact terminal 28 define a travel distance for each navigation actuator 40. In one arrangement, the navigation actuators are formed of a resilient material such as an elastomer.

In step 96, the manufacturer couples a navigation controller pivot 24 to the support mount 22, where the navigation controller pivot 24 defines a substantially hemispherical shape. In one arrangement, the navigation controller pivot 24 is formed at a material similar to the material forming the navigation actuators 40, such as an elastomeric material.

In step 98, the manufacturer aligns a navigation controller 26 with the navigation controller pivot 24, the navigation controller 26 configured to actuate the navigation actuators 40. The navigation controller 26 defines a substantially rounded recess 30 configured to engage and rotate about the navigation controller pivot 24 during an actuation procedure. The substantially rounded recess 30 of the navigation controller 26 and the substantially hemispherical shape of the navigation controller pivot 24 define a navigation controller travel distance 46, where the navigation controller travel distance is approximately one-half the travel distance 44 of each navigation actuator 40. The relative geometry between the navigation controller travel distance 46 and the travel distance 44 of each navigation actuator 40 allows user actuation of no more than two adjacent navigation actuators 40.

In step 100, the manufacturer places a housing 56 in communication with the support mount 22 and in communication with the navigation controller 46. In one arrangement, the manufacturer couples the housing 56 to the support mount 22 to secure the navigation controller 26 within the navigation control assembly 20.

Those skilled in the art will understand that there can be many variations made to the embodiments explained above while still achieving the same objective of those embodiments and the invention in general.

As described above, the navigation to controller headed 24 comprises a substantially hemispherical shape to provide a uniform feel to a user doing during actuation of the navigation controller 26. The navigation controller pivot 24 also reduces friction or functional resistance of the navigation controller 26 during an actuation procedure. In one arrangement, navigation controller pivot 24 is configured to further reduce friction between the navigation controller and navigation controller pivot 24 during an actuation procedure. For example, the navigation controller pivot 24 includes a lubricating oil or a polish to reduce friction between the control 26 and pivot 24.

In another example, as shown in FIGS. 4 and 5, the tactile actuators 70 are not configured with electrically conductive elements 42. Furthermore, the areas opposing the tactile actuators 60 on the support mount 22 are not configured with navigation contact terminals 28. Such a configuration is based upon the design of the navigation control assembly 20 (e.g., actuation of two adjacent navigation actuators 40 produces diagonal motion of an object). In an alternate arrangement, the tactile actuators 60, similar to the navigation actuators 40, create a signal (e.g., navigation signal) upon actuation. For example, the tactile actuators 60 are configured with electrically conductive elements 40 and the areas opposing the tactile actuators 60 on the support mount 22 are configured with navigation contact terminals 28. In such a configuration, activation of the tactile actuators 60 (e.g., alone or in combination with adjacent navigation actuators 40) creates a signal that causes a diagonal motion of an object, such as a cursor on a display.

Such variations are intended to be covered by the scope of this invention. As such, the foregoing description of embodiments of the invention is not intended to be limiting. Rather, any limitations to the invention are presented in the following claims.

What is claimed is:

1. A navigation control assembly comprising:
    a housing;
    a support mount in communication with the housing, the support mount having a plurality of navigation contact terminals;
    a plurality of navigation actuators aligned with the plurality of navigation contact terminals, each of the plurality of navigation actuators configured to engage the plurality of navigation contact terminals to form an electrical contact with each of the plurality of contact terminals, each navigation actuator and each contact terminal defining a travel distance for each navigation actuator;
    a navigation controller pivot coupled to the support mount, the navigation controller pivot defining a substantially hemispherical shape; and
    a navigation controller in communication with the housing, the navigation controller configured to actuate the plurality of navigation actuators, the navigation controller defining a substantially rounded recess configured to engage and rotate about the navigation controller pivot during an actuation procedure, the substantially rounded recess of the navigation controller and the substantially hemispherical shape of the navigation controller pivot defining a navigation controller travel distance, the navigation controller travel distance being approximately one-half the travel distance of each navigation actuator.

2. The navigational control assembly of claim 1 wherein the housing is configured to compress the navigation actuators such that the navigation actuators bias the navigation controller against the housing.

3. The navigational control assembly of claim 1 wherein the housing comprises a lip portion in communication with the navigation controller, the lip portion limiting rotation of the navigation controller about the navigation controller pivot during an actuation procedure.

4. The navigation control assembly of claim 1 wherein each of the plurality of navigation actuators comprises an elastomeric material.

5. The navigation control assembly of claim 4 wherein the navigation controller pivot comprises an elastomeric material.

6. The navigation control assembly of claim 1 further comprising a plurality of tactile actuators in communication with the support mount, at least one tactile actuator interposed between two adjacent navigation actuators, the at least one tactile actuator configured to produce tactile feedback during an actuation procedure actuating the two adjacent navigation actuators.

7. The navigational control assembly of claim 6 wherein each tactile actuator and the support mount define a travel distance for each tactile actuator, the navigation controller travel distance being approximately one-half of the travel distance of each tactile actuator.

8. The navigational control assembly of claim 6 wherein the housing is configured to compress the tactile actuators such that the tactile actuators bias the navigation controller against the housing.

9. The navigation control assembly of claim 6 wherein each of the plurality of tactile actuators comprises an elastomeric material.

10. The navigation control assembly of claim 1 wherein the navigation control assembly is integrally formed with a computerized device.

11. A method for assembling a navigation control assembly comprising the steps of:
producing a support mount having a plurality of navigation contact terminals;
aligning a plurality of navigation actuators with the plurality of navigation contact terminals, each of the plurality of navigation actuators configured to engage the plurality of navigation contact terminals to form an electrical contact with each of the plurality of contact terminals, each navigation actuator and each contact terminal defining a travel distance for each navigation actuator;
coupling a navigation controller pivot to the support mount, the navigation controller pivot defining a substantially hemispherical shape;
aligning a navigation controller with the navigation controller pivot, the navigation controller configured to actuate the plurality of navigation actuators, the navigation controller defining a substantially rounded recess configured to engage and rotate about the navigation controller pivot during an actuation procedure, the substantially rounded recess of the navigation controller and the substantially hemispherical shape of the navigation controller pivot defining a navigation controller travel distance, the navigation controller travel distance being approximately one-half the travel distance of each navigation actuator; and
placing a housing in communication with the support mount and in communication with the navigation controller.

12. The method of claim 11 wherein the step of coupling a housing to the support mount further comprises the step of compressing the navigation actuators with the navigation controller such that the navigation actuators bias the navigation controller against the housing.

13. The method of claim 11 wherein the step of coupling a housing to the support mount further comprises the step of placing a lip portion of the housing in communication with the navigation controller, the lip portion limiting rotation of the navigation controller about the navigation controller pivot during an actuation procedure.

14. The method of claim 11 wherein the step of aligning a plurality of navigation actuators comprises the step of aligning a plurality of navigation actuators, each navigation actuator formed of an elastomeric material.

15. The method of claim 14 wherein the step of coupling a navigation controller pivot comprises the step of coupling a navigation controller pivot formed of an elastomeric material to the support mount, the navigation controller pivot defining a substantially hemispherical shape.

16. The method of claim 11 further comprising the step of coupling a plurality of tactile actuators to the support mount, at least one tactile actuator interposed between two adjacent navigation actuators, the at least one tactile actuator configured to produce tactile feedback during an actuation procedure actuating the two adjacent navigation actuators.

17. The method of claim 16 further comprising the step of defining a travel distance between each tactile actuator and the support mount, the navigation controller travel distance being approximately one-half of the travel distance of each tactile actuator.

18. The method of claim 16 wherein the step of coupling a housing to the support mount further comprises the step of compressing the tactile actuators with the navigation controller such that the tactile actuators bias the navigation controller against the housing.

19. The method of claim 16 wherein the step of coupling a plurality of tactile actuators comprises the step of coupling a plurality of tactile actuators to the support mount, each tactile actuator formed of an elastomeric material.

20. The method of claim 16 further comprising the step of integrally forming the navigation control assembly as part of a computerized device.

21. A means for assembling a navigation control assembly comprising the steps of:
means for producing a support mount having a plurality of navigation contact terminals;
means for aligning a plurality of navigation actuators with the plurality of navigation contact terminals, each of the plurality of navigation actuators configured to engage the plurality of navigation contact terminals to form an electrical contact with each of the plurality of contact terminals, each navigation actuator and each contact terminal defining a travel distance for each navigation actuator;
means for coupling a navigation controller pivot to the support mount, the navigation controller pivot defining a substantially hemispherical shape;
means for aligning a navigation controller with the navigation controller pivot, the navigation controller configured to actuate the plurality of navigation actuators, the navigation controller defining a substantially rounded recess configured to engage and rotate about the navigation controller pivot during an actuation procedure, the substantially rounded recess of the navigation controller and the substantially hemispherical shape of the navigation controller pivot defining a navigation controller travel distance, the navigation controller travel distance being approximately one-half the travel distance of each navigation actuator; and
means for placing a housing in communication with the support mount and in communication with the navigation controller.

* * * * *

UNITED STATES PATENT AND TRADEMARK OFFICE
CERTIFICATE OF CORRECTION

PATENT NO.    : 6,961,052 B1
DATED         : November 1, 2005
INVENTOR(S)   : Seyamak Vaziri It is certified that error appears in the above-identified patent and that said Letters Patent is hereby corrected as shown below:

Title page,
Item [56], References Cited, U.S. PATENT DOCUMENTS,
"6,681,111 B2    1/2004    Ahn et al.           455/420" should read
-- 6,681,110 B1    1/2004    Crookham et al.    455/420 --.

Signed and Sealed this

Eleventh Day of April, 2006

JON W. DUDAS
*Director of the United States Patent and Trademark Office*